(12) United States Patent
Greene et al.

(10) Patent No.: US 8,291,929 B2
(45) Date of Patent: Oct. 23, 2012

(54) DUAL FLOAT ROLLOVER VALVE

(75) Inventors: Jeffrey R. Greene, Richmond, MI (US); Kenneth J. Kalvelage, Rochester Hills, MI (US); Matthew S. Whipple, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1401 days.

(21) Appl. No.: 11/383,513

(22) Filed: May 16, 2006

(65) Prior Publication Data

US 2007/0267064 A1 Nov. 22, 2007

(51) Int. Cl.
*F16K 24/04* (2006.01)
*F16K 31/18* (2006.01)

(52) U.S. Cl. ......... 137/202; 137/398; 137/409; 137/430

(58) Field of Classification Search ............... 137/202, 137/409, 247.21, 398, 430
See application file for complete search history.

(56) References Cited

U.S. PATENT DOCUMENTS

| | | | | | |
|---|---|---|---|---|---|
| 2,510,098 | A | * | 6/1950 | Geisler | 137/43 |
| 4,487,215 | A | * | 12/1984 | Green | 137/43 |
| 5,019,141 | A | * | 5/1991 | Granville et al. | 96/165 |
| 5,215,110 | A | * | 6/1993 | Benjey | 137/43 |
| 5,234,022 | A | * | 8/1993 | Harris | 137/498 |
| RE34,518 | E | * | 1/1994 | Covert et al. | 137/588 |
| 5,318,069 | A | * | 6/1994 | Harris | 137/588 |
| 5,386,843 | A | * | 2/1995 | Church | 137/202 |
| 5,439,023 | A | * | 8/1995 | Horikawa | 137/202 |
| 5,462,100 | A | * | 10/1995 | Covert et al. | 141/59 |
| 5,524,662 | A | * | 6/1996 | Benjey et al. | 137/43 |
| 5,590,697 | A | * | 1/1997 | Benjey et al. | 141/59 |
| 5,640,993 | A | * | 6/1997 | Kasugai et al. | 137/587 |
| 5,762,093 | A | * | 6/1998 | Whitley, II | 137/199 |
| 5,797,434 | A | * | 8/1998 | Benjey et al. | 141/59 |
| 5,809,976 | A | * | 9/1998 | Cook et al. | 123/516 |
| 5,836,341 | A | * | 11/1998 | Ayers et al. | 137/202 |
| 6,138,707 | A | * | 10/2000 | Stuart | 137/202 |
| 6,145,532 | A | * | 11/2000 | Tuckey et al. | 137/202 |
| 6,311,675 | B2 | * | 11/2001 | Crary et al. | 123/516 |
| 6,347,640 | B1 | * | 2/2002 | Meyer | 137/43 |
| 6,443,177 | B2 | * | 9/2002 | Romanek | 137/202 |
| 6,450,192 | B1 | * | 9/2002 | Romanek | 137/202 |
| 6,708,713 | B1 | * | 3/2004 | Gericke | 137/43 |
| 6,739,350 | B1 | * | 5/2004 | Op De Beeck et al. | 137/202 |
| 6,827,098 | B2 | * | 12/2004 | Sugiyama et al. | 137/202 |
| 6,840,262 | B2 | * | 1/2005 | Kojima | 137/202 |
| 6,913,295 | B2 | * | 7/2005 | Kimisawa et al. | 285/423 |
| 6,941,966 | B2 | * | 9/2005 | Mori et al. | 137/202 |
| 6,981,514 | B2 | * | 1/2006 | Nishi | 137/202 |
| 7,032,610 | B2 | * | 4/2006 | Matsuo et al. | 137/202 |
| 7,137,402 | B2 | * | 11/2006 | Tigerholm | 137/202 |
| 2001/0003990 | A1 | * | 6/2001 | Romanek | 137/202 |
| 2001/0011538 | A1 | * | 8/2001 | Crary et al. | 123/509 |
| 2004/0025937 | A1 | * | 2/2004 | Kojima | 137/202 |
| 2004/0187923 | A1 | * | 9/2004 | Nishi | 137/202 |
| 2006/0266415 | A1 | * | 11/2006 | Ganachaud et al. | 137/202 |

\* cited by examiner

*Primary Examiner* — William McCalister

(57) ABSTRACT

The invention concerns a dual float rollover valve for use in a vehicle fuel tank assembly. The rollover valve may include a housing having an upper portion with a top end defining a vapor passage and an opposed bottom end, and an outer wall extending between the top and bottom ends and defining a channel extending therethrough; and a lower portion having a first end engaging with the bottom end of the upper portion, an opposed second end including a vent hole therethrough, and an outer wall extending between the first end and the second end and defining a chamber therein. An inner seal may be mounted between the channel and the chamber and include a seal bore extending from the channel to the chamber, with an upper float mounted in the channel, and a lower float, mounted in the chamber, having a buoyancy relative to fuel such that it is adapted to float on the fuel and selectively seal against the seal bore.

18 Claims, 1 Drawing Sheet

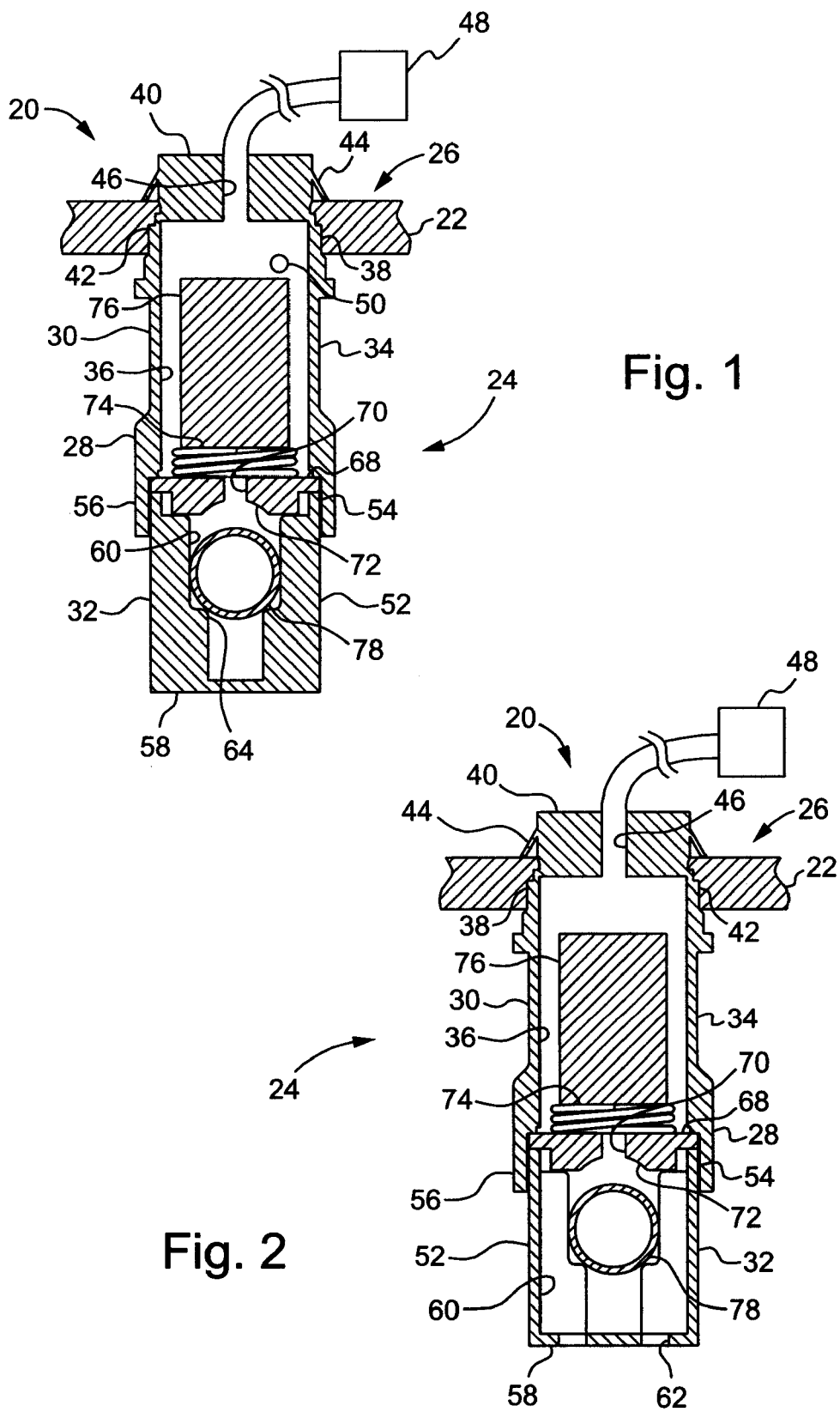

DUAL FLOAT ROLLOVER VALVE

BACKGROUND OF INVENTION

The present invention relates generally to a rollover valve for use in a vehicle fuel tank.

Vehicle fuel tanks employ vent valves as part of evaporative emissions control systems in order to reduce the fuel vapors released from the fuel tank into the atmosphere. One valve used in such systems is commonly called a rollover valve. The rollover valve mounts in the top of the tank and allows fuel vapors to be carried through a vapor passage to an evaporative emissions canister. These fuel vapors can then be burned in the vehicle engine rather than released into the atmosphere. The valve is called a rollover valve because, should the vehicle be in a situation where it is upside down, a float in the valve will block the vapor passage to the evaporative emissions canister. This, then, prevents liquid fuel from flowing out of the tank through the vapor passage.

Fuel tank assemblies may also include fluid limit vent valves, which act in concert with a rollover valve during vehicle refueling. The two valves help reduce the amount of vapors emitted from the fuel tank while it is being refueled. As the tank is filled with liquid fuel, the liquid fuel will reach a level where the fluid limit vent valve closes, so it no longer allows for venting of vapors through it. Once the fluid limit vent valve closes, the remaining fuel vapors in the tank are exhausted through the rollover valve. Additional fuel can be added with the refueling nozzle after the initial shut-off, with the volume dispensed dependant on the type of rollover valve used. The amount of fuel vapor venting is a balance between overfilling the fuel tank and not providing enough venting capabilities, which can lead to a spit-back condition.

This balance may be achieved using valves that start with a small orifice at low pressures and open to a larger orifice when a second stage of a rollover valve opens due to higher tank pressures. This type of arrangement requires balancing of opening pressures for valves from tank system to tank system, and so can be rather difficult. So this is not always a desirable solution.

Another way to vent the fuel tank during refueling involves the use of several valves. Such fuel tank systems have a fluid limit vent valve and two separate rollover valves. The first rollover valve is buried in fuel following the additional fuel added after the initial shut-off (which, as discussed above, caused the fluid limit vent valve to close). The second rollover valve is located to then vent the fuel vapors to the evaporative emission canister. This solution is not particularly desirable, however, because it requires the use of an extra rollover valve to accomplish satisfactory venting capabilities.

SUMMARY OF INVENTION

An embodiment contemplates a dual float rollover valve for use in a vehicle fuel tank assembly. The dual float rollover valve may include a housing having an upper portion with a top end defining a vapor passage and an opposed bottom end, and an outer wall extending between the top and bottom ends and defining a channel extending therethrough; and a lower portion having a first end engaging with the bottom end of the upper portion, an opposed second end including a vent hole therethrough, and an outer wall extending between the first end and the second end and defining a chamber therein. The rollover valve of this embodiment may also include an inner seal mounted between the channel and the chamber and including a seal bore extending from the channel to the chamber, an upper float mounted in the channel, and a lower float, mounted in the chamber, having a buoyancy relative to fuel such that it is adapted to float on the fuel and selectively seal against the seal bore.

An embodiment contemplates a dual float rollover valve for use in a vehicle fuel tank assembly comprising: a housing having an upper portion with a top end defining a vapor passage and an opposed bottom end, an outer wall extending between the top and bottom ends and defining a channel extending therethrough, and a bleed orifice extending through the outer wall; and a lower portion having a first end engaging with the bottom end of the upper portion, an opposed second end including a vent hole therethrough, and an outer wall extending between the first end and the second end and defining a chamber therein; an inner seal mounted between the channel and the chamber and including a seal bore extending from the channel to the chamber; and a lower float, mounted in the chamber, having a buoyancy relative to fuel such that it is adapted to float on the fuel and selectively seal against the seal bore.

An embodiment contemplates a fuel tank assembly having a valve cover and an evaporative emissions canister. The fuel tank assembly of this embodiment also includes a dual float rollover valve, mounted to the valve cover, and including a housing having an upper portion with a top end defining a vapor passage in fluid communication with the evaporative emissions canister, an opposed bottom end, an outer wall extending between the top and bottom ends and defining a channel extending therethrough, and a bleed orifice extending through the outer wall; and a lower portion having a first end engaging with the bottom end of the upper portion, an opposed second end including a vent hole therethrough, and an outer wall extending between the first end and the second end and defining a chamber therein. The rollover valve of this embodiment also has an inner seal mounted between the channel and the chamber and including a seal bore extending from the channel to the chamber, an upper float mounted in the channel, and a lower float, mounted in the chamber, having a buoyancy relative to fuel such that it is adapted to float on the fuel and selectively seal against the seal bore.

An advantage of an embodiment is that the dual float rollover valve allows for controlled refueling events by reducing the chances for spit-back while still generally preventing additional fuel from being added to the fuel tank when it has reached the desired maximum level in the tank.

An advantage of an embodiment is that the controlled refueling is accomplished without the additional costs, parts, and assembly needed if two separate rollover valve assemblies are employed.

BRIEF DESCRIPTION OF DRAWINGS

FIG. 1 is a partially schematic, cross section view of a portion of a fuel tank assembly, in accordance with an embodiment.

FIG. 2 is a view similar to FIG. 1, but with the cross section aligned with lower housing vent holes in a dual float rollover valve.

DETAILED DESCRIPTION

FIGS. 1-2 illustrate a fuel tank assembly, indicated generally at 20, which includes a valve cover 22 to which a dual float rollover valve assembly, indicated generally at 24, is mounted. The valve cover 22 is part of a fuel tank, indicated generally at 26, and may be conventional—it is typically secured to a top of the fuel tank by welding. The fuel tank assembly 20 may also include a fluid limit vent valve (not shown), which may be conventional and so will not be discussed in any detail herein.

The dual float rollover valve assembly 24 has a housing 28, with an upper portion 30 and a lower portion 32. The upper portion 30 includes a generally cylindrical outer wall 34 that defines a channel 36 extending therethrough. The outer wall 34 may include an outer surface portion 38 that mates and seals with the valve cover 22. A mount portion 40, extending from a top end 42 of the outer wall, 34 may include a retention flange 44 for retaining the valve assembly 24 in the cover 22. The outer wall 34 also includes a bleed orifice 50, extending from the channel 36 into the interior of the fuel tank 26. The bleed orifice 50 may be an opening with a diameter, for example, in the range of 0.02 cm to about 0.03 cm.

The mount portion 40 also defines a vapor passage 46 therethrough. The vapor passage 46 may be an opening with a diameter, for example, in the range of about 0.23 cm to about 0.31 cm. The particular diameters of the bleed orifice 50 and the vapor passage 46 given herein are only examples and may be different depending on the particular fuel tank assembly employed. What is desired is that the bleed orifice 50 have a significantly smaller diameter so that the rate of vapor flow through it will be significantly less than the amount of vapor that can flow through the vapor passage 46.

The vapor passage 46 is in fluid communication with an evaporative emissions canister 48. The evaporative emissions canister 48 and various connecting tubes, etc., may be conventional and so will not be discussed in detail herein.

The lower portion 32 of the housing 28 has a generally cylindrical outer wall 52 that mounts at a first end 54 to a bottom end 56 of the upper portion 30, and includes a generally enclosed second end 58. The outer wall 52 and second end 58 define an enclosed chamber 60. A pair of vent holes 62 extend through the second end 58 into the chamber 60. While a pair of vent holes 62 are shown, other numbers of vent holes may be employed instead, if so desired. The lower portion 32 also includes lower float supports 64 that extend inward from the outer wall 52.

An inner seal 68 mounts between the upper portion 30 and the lower portion 32. The inner seal 68 includes a seal bore 70, which connects the chamber 60 to the channel 36. A float seat 72 surrounds the seal bore 70 and faces into the chamber 60.

A spring 74 mounts on top of the inner seal 68, with an upper float 76 supported by the spring 74. The spring 74 is of sufficient strength to prevent the upper float 76 from completely compressing the spring and blocking fuel vapors from flowing through the seal bore 70. The spring 74 also does not cause the upper float 76 to press against and block the vapor passage 46 when the rollover valve assembly 24 is in an upright position.

A spherical shaped lower float 78 is mounted in the chamber 60. When there is no fuel in the chamber 60, the lower float 78 rests on the lower float supports 64. The lower float 78 has an overall density that is less than liquid fuel, so it is buoyant and will float on top. Thus, as liquid fuel fills the chamber 60, the lower float 78 will float upward, eventually sealing against the float seat 72 and blocking the seal bore 70.

The operation of the dual float rollover valve 24 during a vehicle fuel tank refueling event will now be discussed. The rollover valve assembly 24 allows for controlled filling of the fuel tank assembly 20. Before the refueling event, the upper float 76 rests on the spring 74 and the lower float 78 rests on the lower float supports 64, so the flow of fuel vapors in the valve 24 between the vent holes 62 and the vapor passage 46 is not blocked.

During a refueling event, as vapor pressure in the tank 26 increases, fuel vapor will eventually enter the rollover valve 24 through the two vent holes 62—beginning once the fluid limit vent valve (not shown) has closed. The fuel vapor continues up and around the lower float 78, through the seal bore 70, around the upper float 76, and into the vapor passage 46. At the time that the fluid limit vent valve closes, enough distance remains between the level of the liquid fuel and the second end 58 of the lower portion 32 to allow for a predetermined amount of additional fuel to be dispensed into the fuel tank 26 before the liquid fuel reaches the second end 58.

After the liquid fuel reaches the second end 58, covering the vent holes 62, the internal pressure in the fuel tank 26 will force liquid fuel up into the chamber 60. As the liquid fuel rises in the chamber 60, it will cause the lower float 78 to move up against the float seat 72, blocking flow through the seal bore 70. At this point, fuel vapors can only flow into the channel 36 through the small bleed orifice 50, significantly restricting the flow of the vapors into the vapor passage 46. The small rate of vapor flow through this small bleed orifice 50 is enough to help reduce the chance of spit-back onto the person filling the fuel tank, but is low enough that it will generally prevent additional fuel from being dispensed into the fuel tank 26—thus ending a refueling event.

Once the tank pressure is relieved (after the refueling event), the column of fuel within the dual float rollover valve assembly 24 will drop down to the fuel level in the tank 26 external to the rollover valve 24. Accordingly, fuel vapors will again be able to flow between the vent holes 62 and the vapor passage 46.

And, should the vehicle at some later time become inverted, the upper float 76 will seat over the vapor passage 46, blocking flow into the passage. Thus, the rollover valve functionality is preserved.

While certain embodiments of the present invention have been described in detail, those familiar with the art to which this invention relates will recognize various alternative designs and embodiments for practicing the invention as defined by the following claims.

What is claimed is:

1. A dual float rollover valve for use in a vehicle fuel tank assembly comprising:

a housing having an upper portion with a top end defining a vapor passage and an opposed bottom end, an outer wall extending between the top and bottom ends and defining a channel extending therethrough, and a bleed orifice extending through the outer wall; and a lower portion having a first end engaging with the bottom end of the upper portion, an opposed second end including a vent hole therethrough, and an outer wall extending between the first end and the second end and defining a chamber therein;

an inner seal mounted between the channel and the chamber and including a seal bore extending from the channel to the chamber;

an upper float mounted in the channel; and a lower float, mounted in the chamber, having a buoyancy relative to fuel such that it is adapted to float on the fuel and selectively seal against the seal bore.

2. The valve of claim 1 wherein a diameter of the bleed orifice is significantly smaller than a diameter of the vapor passage.

3. The valve of claim 1 wherein the vapor passage is in fluid communication with an evaporative emissions canister.

4. The valve of claim 1 including a spring mounted between the upper float and the inner seal.

5. The valve of claim 1 wherein the lower float is a spherical shape and the inner seal includes a float seat extending around the seal bore and shaped to mate in sealing engagement with the lower float.

6. The valve of claim 5 wherein the lower portion includes a lower float support that selectively engages with the lower float to space the lower float from the second end.

7. The valve of claim 5 wherein the outer wall of the upper portion includes a bleed orifice extending therethrough, and a diameter of the bleed orifice is significantly smaller than a diameter of the vapor passage.

8. The valve of claim 1 wherein the lower portion includes a lower float support that selectively engages with the lower float to space the lower float from the second end.

9. The valve of claim 1 wherein the second end includes at least a second vent hole therethrough.

10. A dual float rollover valve for use in a vehicle fuel tank assembly comprising:
a housing having an upper portion with a top end defining a vapor passage and an opposed bottom end, an outer wall extending between the top and bottom ends and defining a channel extending therethrough, and a bleed orifice extending through the outer wall; and a lower portion having a first end engaging with the bottom end of the upper portion, an opposed second end including a vent hole therethrough, and an outer wall extending between the first end and the second end and defining a chamber therein; and wherein a diameter of the bleed orifice is significantly smaller than a diameter of the vapor passage;
an upper float mounted in the channel;
an inner seal mounted between the channel and the chamber and including a seal bore extending from the channel to the chamber; and
a lower float, mounted in the chamber, having a buoyancy relative to fuel such that it is adapted to float on the fuel and selectively seal against the seal bore.

11. The valve of claim 10 wherein the lower float is a spherical shape and the inner seal includes a float seat extending around the seal bore and shaped to mate in sealing engagement with the lower float.

12. The valve of claim 11 wherein the lower portion includes a lower float support that selectively engages with the lower float to space the lower float from the second end.

13. A fuel tank assembly comprising:
a valve cover;
an evaporative emissions canister; and
a dual float rollover valve, mounted to the valve cover, and including a housing having an upper portion with a top end defining a vapor passage in fluid communication with the evaporative emissions canister, an opposed bottom end, an outer wall extending between the top and bottom ends and defining a channel extending therethrough, and a bleed orifice extending through the outer wall, and a lower portion having a first end engaging with the bottom end of the upper portion, an opposed second end including a vent hole therethrough, and an outer wall extending between the first end and the second end and defining a chamber therein; an inner seal mounted between the channel and the chamber and including a seal bore extending from the channel to the chamber; an upper float mounted in the channel; and a lower float, mounted in the chamber, having a buoyancy relative to fuel such that it is adapted to float on the fuel and selectively seal against the seal bore.

14. The fuel tank assembly of claim 13 wherein a diameter of the bleed orifice is significantly smaller than a diameter of the vapor passage.

15. The fuel tank assembly of claim 13 wherein the dual float rollover valve includes a spring mounted between the upper float and the inner seal.

16. The fuel tank assembly of claim 13 wherein the lower float is a spherical shape and the inner seal includes a float seat extending around the seal bore and shaped to mate in sealing engagement with the lower float.

17. The fuel tank assembly of claim 16 wherein the lower portion includes a lower float support that selectively engages with the lower float to space the lower float from the second end.

18. The fuel tank assembly of claim 13 wherein the lower portion includes a lower float support that selectively engages with the lower float to space the lower float from the second end.

* * * * *